(12) United States Patent
Shirk et al.

(10) Patent No.: US 8,374,959 B2
(45) Date of Patent: *Feb. 12, 2013

(54) MANAGING LEAD-BASED FEEDBACK IN A NETWORK COMMERCE SYSTEM

(75) Inventors: Valerie K. Shirk, San Jose, CA (US); Jason M. Heidema, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 1178 days.

This patent is subject to a terminal disclaimer.

(21) Appl. No.: 11/693,073

(22) Filed: Mar. 29, 2007

(65) Prior Publication Data

US 2008/0243695 A1  Oct. 2, 2008

(51) Int. Cl.
*G06Q 40/00* (2006.01)
*G06Q 30/00* (2006.01)

(52) U.S. Cl. ......................... 705/40; 705/26.1

(58) Field of Classification Search ............. 705/53, 705/40, 44, 26, 27, 8, 26.1; 701/53, 40, 44, 701/26, 27, 8
See application file for complete search history.

(56) References Cited

U.S. PATENT DOCUMENTS

| 5,237,499 | A  | * | 8/1993 | Garback ........................ 705/5 |
| 6,457,005 | B1 | * | 9/2002 | Torrey .......................... 707/5 |
| 2002/0026398 | A1 | * | 2/2002 | Sheth .......................... 705/37 |
| 2002/0069093 | A1 | * | 6/2002 | Stanfield ........................ 705/5 |
| 2003/0069744 | A1 | * | 4/2003 | Craig et al. ..................... 705/1 |
| 2003/0083895 | A1 | * | 5/2003 | Wright et al. ................... 705/1 |
| 2003/0167195 | A1 | * | 9/2003 | Fernandes et al. ............... 705/8 |
| 2003/0229900 | A1 | * | 12/2003 | Reisman ...................... 725/87 |
| 2004/0098287 | A1 | * | 5/2004 | Young et al. .................... 705/5 |
| 2005/0171838 | A1 | * | 8/2005 | Eglinton ...................... 705/14 |
| 2005/0288953 | A1 | * | 12/2005 | Zheng ........................... 705/1 |
| 2006/0041500 | A1 | * | 2/2006 | Diana et al. .................. 705/37 |
| 2007/0156446 | A1 | * | 7/2007 | Jolly et al. ...................... 705/1 |

* cited by examiner

*Primary Examiner* — Mary Cheung
*Assistant Examiner* — Daniel L Greene
(74) *Attorney, Agent, or Firm* — Schwegman Lundberg & Woessner, P.A.

(57) ABSTRACT

A network commerce system comprises a product sale listing searchable by a consumer and comprising one or more products provided by a third-party. A lead tracking module is operable to track consumer leads provided to the third-party vendor. A communications module enables the consumer and third-party vendor to communicate; and a feedback module enables at least one of the consumer and the third-party vendor to leave feedback regarding a lead tracked via the lead tracking module based on a handshake.

28 Claims, 3 Drawing Sheets

MANAGING LEAD-BASED FEEDBACK IN A NETWORK COMMERCE SYSTEM

FIELD

The present application relates generally to network commerce, and more specifically in one example to a managing lead-based feedback in a network commerce system.

BACKGROUND

The Internet and other networks such as cellular phone networks have enabled consumers to shop and compare prices, service, and products through a variety of sources. Consumers can use their computers or other network devices to visit a variety of network commerce providers such as websites, and can research and purchase items more quickly than it may typically take to drive to a shopping mall.

Some websites specialize in certain products, such as websites that sell only electronics or network commerce providers that sell only books, while others sell a wider variety of items. Not all websites are simply commercial sales businesses; other sales formats such as classified ad listings or auctions have become popular, including perhaps the best-known auction website, EBay™. Because some websites such as EBay™ typically involve transactions between individual consumers and not well-known or trusted retailers, various feedback mechanisms enabling sellers and buyers to provide feedback regarding transactions are often provided. In one such example, the bidding and purchasing process is guided by the auction website or other network commerce system, and feedback can be left as a part of the purchasing process.

The listings at auction sites may not always include all products that sellers seek to find, and so sometimes include classified ad or pay-per-lead listings provided by third party retailers or other parties. These listings can provide a buying opportunity for consumers visiting the auction site when no suitable products are available for auction, or can provide a greater number of products than are available for auction when an item is in high demand. The variety of products available is typically also enhanced, and availability is not dependent on the term of an auction. In some examples, the selected product is bought directly from the third party provider using the vendor's own purchasing systems such as credit card, online payment, or other purchasing transaction systems used for other retail purchases. In other examples, the seller advertises a service, such as installation, repair, wedding photography, or other such services.

But, certain challenges may exist for network commerce providers and for consumers relating to the quality of service provided by these third party vendors or for sales conducted outside the auction process in an auction environment. Because the transaction isn't completed using the auction process, the various features and protections offered by the auction completion process such as payment escrow, feedback, and consumer protection mechanisms and dispute resolution processes are not provided as part of the transaction.

It is desired to better manage third-party vendor transactions in environments such as an auction website or other network commerce system.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a network commerce system, or a method or software for operating a network commerce system, comprising a feedback system for pay-per-lead third party vendors or other vendors where the transaction may take place in part external to the commerce system. A product sale listing is searchable by a consumer and comprising one or more products provided by a third-party vendor. A pay-per-lead tracking module is operable to track consumer leads provided to the third-party vendor. A communication module enables the consumer and third-party vendor to communicate via internal or external communication channels, and a feedback module enables at least one of the consumer and the third-party vendor to leave feedback regarding a lead tracked via the pay-per-lead tracking module based on a handshake.

The handshake comprises in some examples various forms of communication between parties, such as one-way or two-way communication, communication meeting certain length or size requirements, or communication satisfying other qualifying attributes. In a more detailed example, the handshake comprises at least one of payment or confirmation of a completed transaction. The completed transaction may or may not include payment in various embodiments, and in some embodiments comprises confirmation from both the consumer and the third-party vendor that an agreement has been reached.

In a further example, a payment module is operable to manage payment from a consumer to a third-party vendor. The payment in one embodiment is further operable to bill the third-party vendor for use of the system, such as by charging the third-party vendor a percentage of a completed transaction, or by billing the third-party vendor on a pay-per-lead basis.

Figure 1:
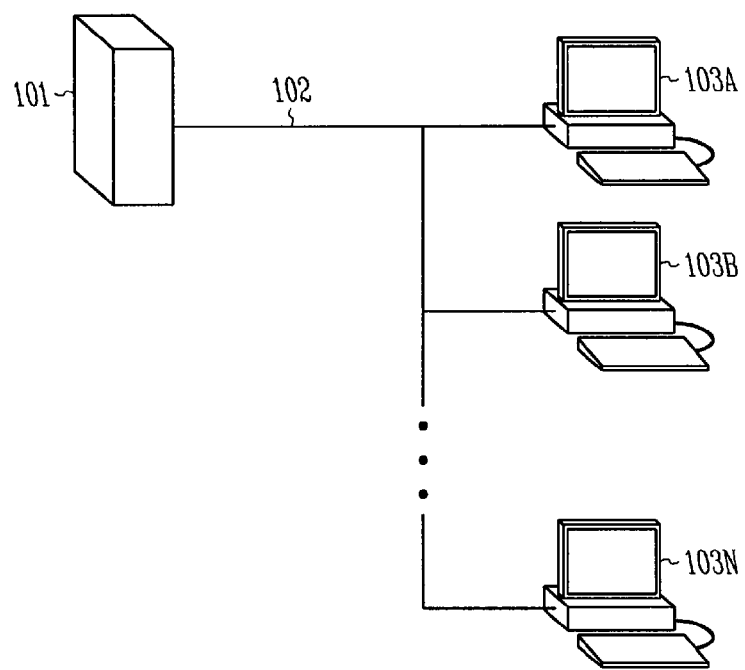
FIG. 1 is a block diagram of a network commerce system, as may be used to practice some embodiments of the invention.

FIG. 1 is a block diagram of a networked commerce system, as may be used to practice some embodiments of the invention. The commerce system in various embodiments comprises various combinations of hardware and software to provide functions and services such as those needed to facilitate commerce between parties on a Network, such as an Internet auction website.

A network server 101 is coupled to a network 102. The network further couples various other computers 103a through 103n to the server. In some embodiments, the network includes other parts, such as routers, switches, and other computerized elements. Alternate embodiments include substitution of elements such as the computers 103 with other computerized devices, such as cell phones, PDAs, or set-top boxes.

The server in this example runs one or more software applications, which in alternate embodiments are run across two or more servers, to provide various network commerce functions. In one example, auction website software and related databases of items for sale are stored on the server, along with data related to the sellers of the items, registered purchasers, and details such as feedback regarding completed transactions.

In operation, a third-party vendor or seller uses a remote computer such as 103a-n to post or list an item for sale, such as an item to be sold at auction or an item to be sold at a fixed price, or creates a sale item listing that refers a buyer to the seller's own website, store, or other place of commerce. The website is also available to prospective buyers, who can search and bid for items for sale, such as bidding on an auction, buying a fixed price item for sale, or following a link to an external vendor having a sale listing posted on the server 101.

The network commerce provider operates as a business by charging certain fees, such as for listing an item for sale, or for purchasing an item at auction. Because the terms of the transaction are typically set or negotiated through the network commerce system, the value of the transaction and the fees owed can be readily measured and charged to the appropriate parties. In instances where the item listed for sale is a reference to an external or third-party seller such that the transaction may be negotiated or completed on a website or via other mechanisms external to the network commerce service, alternate means of compensation for referring customers to the third-party vendors are sometimes provided.

In one such example, a third-party vendor provides a listing of an item or items for sale in a pay-per-lead format, such that the third-party vendor is willing to pay a certain amount for potential customer leads generated via the listing on the network commerce system. In another example, the listing is in a fixed price, auction, or other format. The leads are tracked and confirmed by a lead tracking module. The lead tracking module and other modules within the network commerce system are in various embodiments comprising software, hardware, user intervention or instruction, and various combinations thereof. In this example, the third-party vendor provides a list of items for sale, and agrees to pay the network commerce service provider a certain fee for each lead produced or each transaction completed regarding one of the listed sale items.

In some further embodiments, the nature of the leads qualifying for pay-per-lead payment is further defined, such as by requiring some minimum level of communication between the third-party vendor and the potential customer. For example, the customer may send an e-mail to the third-party vendor via an interface or e-mail system provided by the network commerce system provider, or may send a text message, voice message, or initiate an online teleconference with the vendor. In further examples, the customer uses a system provided by the network commerce system provider or initiates use of an external communications channel via a communications module in the network commerce system to initiate contact with the third-party vendor, such that the contact can be characterized or tracked by the network commerce provider.

In one such example, a teleconferencing service provided by or associated with the network commerce system is used to contact the third-party vendor, and characteristics of the teleconference are monitored to determine that the contact constitutes a qualified lead. For example, a teleconference that is initiated but that is not received or that does not contain any content will not be recognized as a qualified lead in some embodiments. In other embodiments, the duration of the teleconference or videoconference must be a minimum length, such as five or ten seconds, for the lead to constitute a qualified lead. Similarly, where contact between a potential customer and a third-party vendor takes another form such as e-mail, the content, delivery, and length of the e-mail can be used to determine whether the lead is a qualified lead. For example, an e-mail message that has no content, or that contains fewer than ten characters, may be ignored and not considered a qualified lead. Similarly, an e-mail that can't be delivered, doesn't contain appropriate customer contact information, or that is from the same potential customer as another qualified lead can be ignored as a lead that is not qualified for payment on a pay-per-lead basis.

Figure 2:
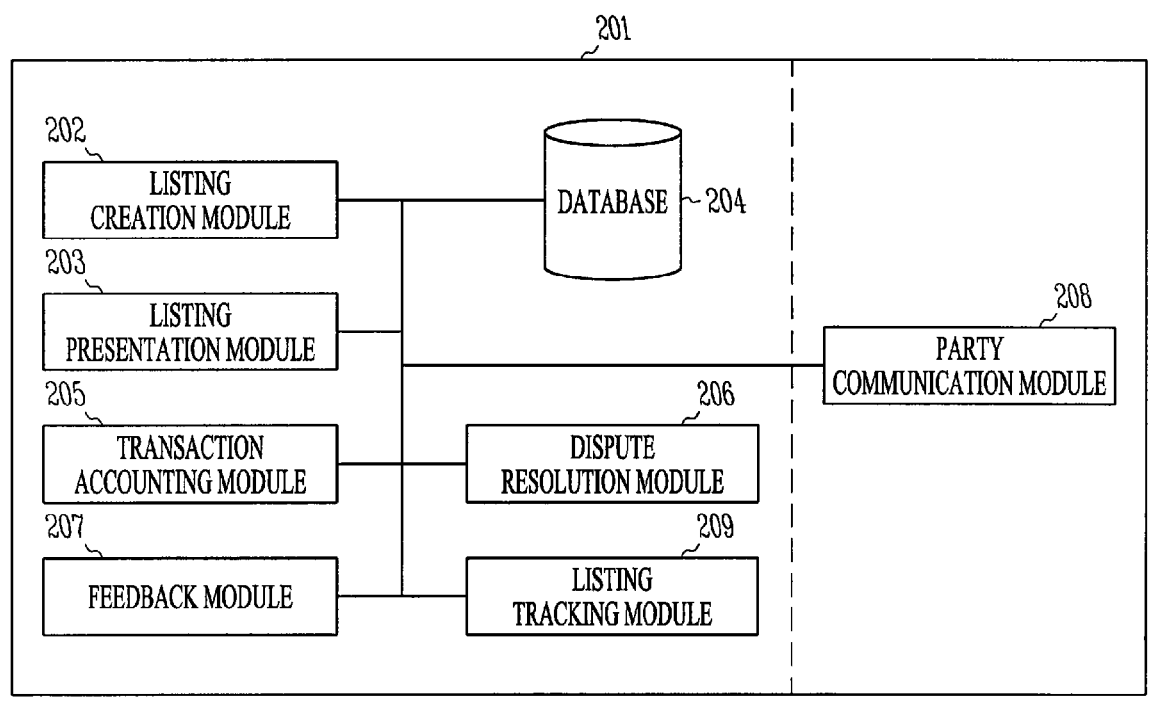
FIG. 2 is a block diagram of a network commerce system server, consistent with an example embodiment of the invention.

In another example, the third-party vendor provides a sale listing such as a classified advertisement or pay-per-lead listing indicating the seller's desired, fixed price. The system displays the item and price in a sale listing, such as in the results of a keyword or category search, to a consumer using the network commerce system to shop for an item. When the consumer finds a suitable for sale listing, he contacts the third-party vendor via a communication channel such as e-mail, video conference, voice call, or text message. The communication channel in various embodiments is internal or external to the network commerce system. Once the parties have agreed to a transaction, confirmation of the transaction is recorded in the network commerce system as a handshake, confirming that a transaction has reached the point where it qualifies for the transaction parties to leave feedback regarding the transaction. In other embodiments, the handshake comprises payment, or comprises an indication from both parties that a certain stage of the transaction has been reached. The handshake in further embodiments comprises various forms of communication between parties, such as one-way or two-way communication, communication meeting certain length or size requirements, or communication satisfying other qualifying attributes FIG. 2 is a more detailed block diagram of a network commerce system server, consistent with an example embodiment of the inventions. The various modules or elements shown in FIG. 2 need not be embodied in the same server or in a server, but exist in various combinations as hardware, software, user intervention or input, and externally provided information.

In this example, the server 201 comprises a listing creation module 202 and a listing presentation module 203, coupled to a database 204. The listing creation module enables creation or submission of items for sale, and in various embodiments facilitates gathering data related to the item for sale, creation of a web page or other presentation regarding the item for sale, and provides various tools or functions for managing a particular seller's items for sale. The listing creation module in some embodiments interfaces with external modules, such as an external automated listing generator. For sale listings generated by or received in the listing creation module are stored in the database 204, for retrieval and presentation by the listing presentation module 203. The listings comprise in some embodiments fixed price listings, auction listings, pay-per-lead listings, classified ad listings, and other sale listings.

The listing presentation module 203 enables a potential customer to browse or search the items for sale, such as browsing items in a particular category of items or searching for various keywords or characteristics of items for sale. The listings are provided in one example via a website, while in other embodiments they are provided in other format such as through a text message sent to a cell phone or an e-mail message sent in response to an inquiry.

When a customer identifies an item to bid on or to purchase and a transaction is initiated, the transaction is accounted in the transaction accounting module 205. In an auction, this records the winning bid price, shipping or other fees, and charges the appropriate party the appropriate fee for the transaction. The fee in one example is a percentage of the final bid price and is charged to the seller, but in other examples includes a fixed fee or a fee charged to the buyer as part of the purchase. In other examples, the customer may be selecting a product or a service, such as installation, repair, or some other such service, such as to collect quotes for a particular service to be performed. In some such cases, no product need actually be sold, as the customer may only be collecting quotes for such a service. Some systems will charge a fee for leads provided in this manner via a listing tracking module 209 and a transaction accounting module 205, such as charging a predetermined pay-per-lead fee to the service provider advertising through the commerce system.

In another example, a fixed price listing is created using the listing creation module 202, and is searchable using the listing presentation module 203. When a consumer finds a sale listing and desires to purchase the product or service being offered, communication between the consumer and the third party vendor is initiated via communication module 208. Communication in some embodiments is external to the network commerce system, but in other embodiments is provided by or managed by the network commerce system. When terms of an agreement are reached, a transaction is initiated via transaction accounting module 205. Listing tracking module 209 further records the transaction state, including in one embodiment occurrence of a handshake event qualifying the transaction for feedback. In one embodiment, both parties must consent that an agreement has been reached, or that a transaction has taken place, for the handshake to occur. In other embodiments, other evidence of a transaction state such as completed payment, selection or agreement to transaction terms, meeting a qualifying level of communication, or other such evidence will show the state of a transaction and qualify as a handshake event, enabling feedback for the transaction.

Other aspects of the transaction are managed by other modules, such as the dispute resolution module 206, which manages resolution of disputes between parties involved in a transaction such as where a purchased product is not received, a customer fails to pay for a purchased product, or a purchased product received does not match the description of the product in the sale listing. The dispute resolution module facilitates gathering and exchanging information, as well as facilitating resolution or unwinding of a disputed transaction.

The feedback module 207 enables users to provide feedback regarding transactions, such as when an auction winner completes a transaction and wishes to provide feedback regarding the seller's description of the item, packing and shipping the item, timeliness in handling the transaction, or quality of the item purchased. In other examples, the feedback module is used to provide feedback regarding services, quotes, negotiations, or other business associations between parties. The feedback in some embodiments requires the transaction to proceed to a certain stage, such as until after payment, agreement to terms, or some other handshake event has taken place.

The party communication module 208 is also provided, which may or may not be a part of the computer systems under the network commerce system provider's control. The party communication module enables communication between various parties, such as between vendors and consumers to arrange or perform some element of a commerce transaction. In one such example, an auction listing enables the user to contact the seller to ask questions regarding the item for sale via the party communication module, which in further embodiments is able to anonymously forward messages so that actual e-mail, telephone, or other direct contact information is not directly available to other network commerce system users.

In this example, the party communication module also facilitates communication between parties offering merchandise in a variety of formats, such as a pay-per-lead listing format, in which the party having an item for sale pays for leads meeting certain criteria in addition to or instead of paying for other services. In one such example, the party communications module facilitates and tracks communication between parties, so that tracked communication can be used to qualify a lead and charge the pay-per-lead format fee to the seller.

Figure 3:
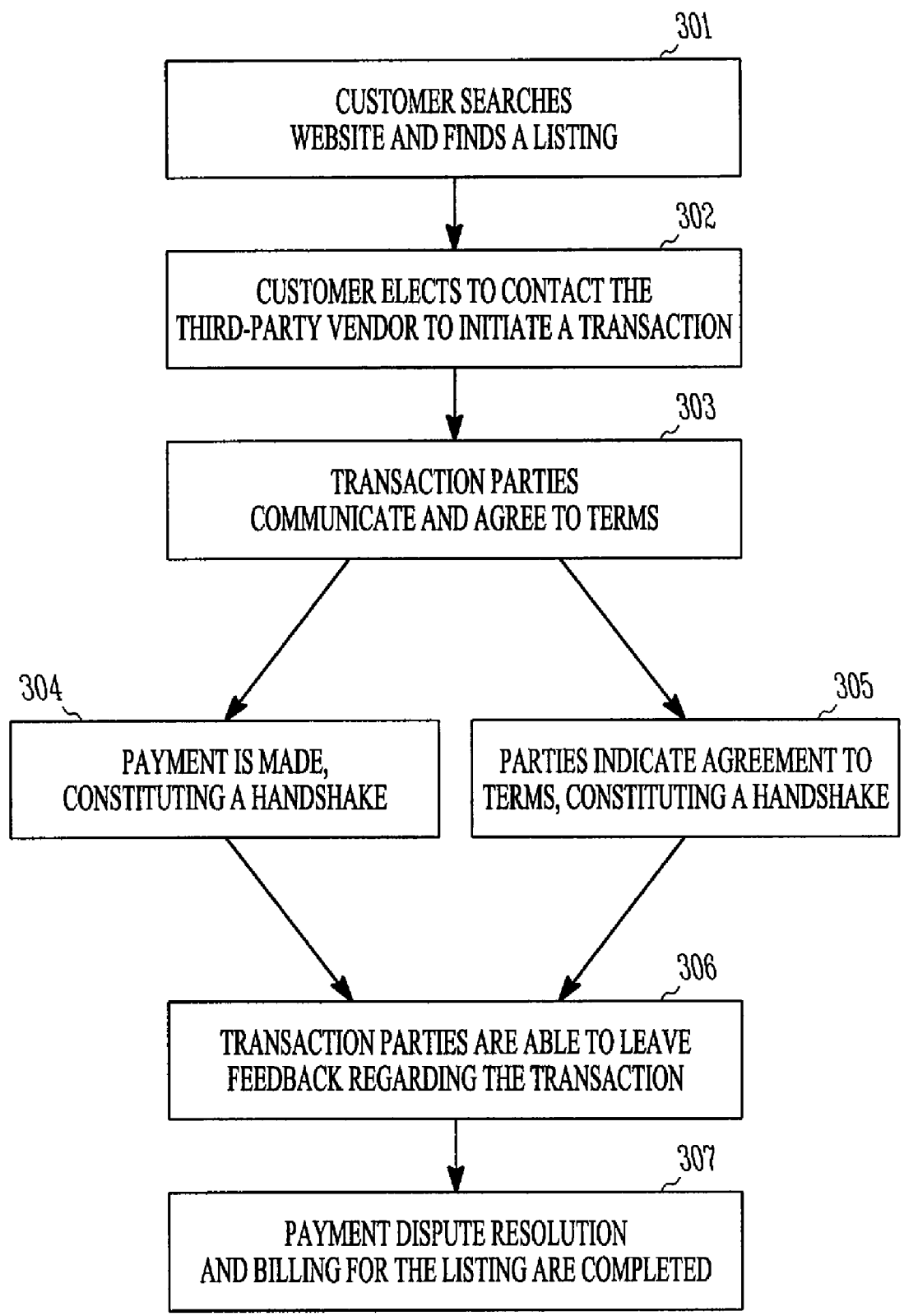
FIG. 3 is a flowchart, illustrating an example method of practicing the present invention.

Following the flowchart of FIG. 3, a user of a network commerce site such as an online commerce site performs a search or browses listings of items meeting certain criteria. The pay-per-lead listing has already been created and posted, and the vendor has specified terms of the item's sale, such as an auction starting price, a reserve price, a fixed price, or agreed to a pay-per-lead format. Here, a keyword search on an electronic commerce site turns up a number of fixed price, pay-per-lead, and auction listings, including information regarding the product for sale, such as price, specifications, condition, or other relevant information. The customer selects a fixed price listing, and reads it more carefully at 302, determining that the product meets his needs. The customer then elects to contact the seller, such as by sending an e-mail, placing a call, or initiating an online instant message or conference session via the party communication module. Any other method of communication can also be adapted for use via the communication module, such as providing a traditional mail address, providing a phone number and contact information, or providing other requested seller contact information.

The parties to the transaction agree to terms at 303, such as by negotiating a sale price, winning an auction, accepting a fixed-price offer to sell, or providing an estimate for services to be provided. Once a minimum transaction stage is reached, a handshake is determined to have occurred, enabling the parties to leave feedback regarding the transaction. In one example, this occurs when payment is made for the sale item or service at 304. In another example, this occurs when both parties have indicated agreement to terms of a transaction, as shown at 305. Agreement to terms of a transaction in various embodiments includes a consumer accepting a vendor's fixed price, a consumer winning an auction listed by the vendor, the vendor and consumer negotiating and agreeing to terms for a particular product or service, or a pay-per-lead listing resulting in communication or agreement between the consumer and vendor. In another example, the handshake comprises occurrence of various forms of communication between parties, such as one-way or two-way communication, communication meeting certain length or size requirements, or communication satisfying other qualifying attributes The status of the transaction is tracked via the listing module 209 of FIG. 2 or through other means, and is used to determine whether feedback can be left at 306. If the handshake criteria have been met, feedback is enabled and a feedback option is made available to at least one of the seller and vendor. Other transaction stages after the handshake event, such as payment from the consumer to the vendor, dispute resolution such as dissatisfaction with the item or service sold, and billing the vendor or consumer for use of the network commerce system are therefore handled at 307.

In some embodiments, the vendor and seller leave the network commerce system at 303, such as where the use external communications services to negotiate or agree to a transaction. In one example, the prospective customer uses online communications services such as an instant messaging service, a network conference such as a videoconference or chat window, or another network service to establish communication with the seller. The customer in one such example uses contact information provided as a part of the listing to contact the seller via the communications module, such that the communications module is able to track contact between parties. In a more detailed example, the customer uses a phone service provided by the network commerce system, such as using a network telephone to contact the seller. In other examples, the network commerce site is accessed via a cell phone, personal digital assistant, or other device having cellular or other phone capability, and the phone device is used to contact the seller. Alternatively, a direct-dial telephone number provided by the vendor is provided to the customer. In a further example, the phone service or telephone number provided to the consumer is managed or provided by the network commerce system, such that the network commerce system is able to redirect the call to the seller and track communication between the consumer and seller or service provider.

In another embodiment, the communication module refers the parties to an outside communication provider, such as by revealing external telephone numbers or e-mail addresses. In some pay-per-lead formats, the remainder of the transaction may be completed away from the network commerce system, but in other embodiments the transaction must return for a handshake event to occur to enable feedback regarding the transaction.

This return to the network commerce system takes place at 304 or 305 of the example illustrated in the flowchart of FIG. 3, but in other examples takes place by satisfying other handshake criteria indicating that the transaction has reached a certain stage sufficient to enable feedback regarding the transaction.

In one more detailed example, the return to the network commerce system to provide handshake evidence comprises at least one party to the transaction indicating that the transaction is complete or has reached another stage qualifying the transaction for feedback. One or more other parties to the transaction confirm the transaction has reached that stage or is complete, and the transaction has been confirmed as having met the handshake criteria. In an alternate example, the return to the network commerce system takes the form of payment, such as via the transaction accounting module 205. In some embodiments this is an internal service of the network commerce system, or is an affiliated part of the network commerce system such as PayPal™. In another embodiment, payment takes place via other means and is reported back to the network commerce system, resulting in completion of the handshake criteria as illustrated at 304 of FIG. 3.

The feedback system in one example requires identification of the reviewing party to leave feedback, but does not necessarily require that a transaction be complete or that a handshake have occurred before leaving feedback. In such embodiments, use of a handshake can be used to distinguish those who have entered into a confirmed transaction with the party being reviewed from those whose feedback may not reflect an actual transaction or experience with the reviewed party. In a further example, the handshake comprises different levels of interaction, such as communication, negotiation, and a completed transaction, and feedback is weighted based on the handshake level reached such that system confidence in occurrence of a transaction results in weighting or displaying corresponding feedback differently.

This system enables other parties to gauge the credibility of the review, while enabling all those who wish to review a particular party the opportunity to do so. Feedback left via the feedback module 207 is stored, and becomes a part of a feedback record for various parties in the network commerce system. Other users can view the feedback left for a particular user, whether in detail or in summary, so that the reliability of the party in question can be gauged as a potential party to a commerce transaction. The feedback record of a typical transaction-based online system, such as an online auction system or other commerce system, provides the parties involved in a transaction the opportunity to leave feedback for one another when the transaction is completed. For example, the winning bidder and seller in an auction are both able to leave feedback regarding conclusion of the auction transaction, such as regarding shipping, packaging, accuracy of the description of the item for sale, and any other such information so that parties conducting transactions with either of the two parties in the future can rely on the history and good reputation of a party with favorable feedback, or be cautious if a party has very little or poor feedback.

But, such a feedback system does not provide for feedback where a part of the transaction takes place or is completed outside the network commerce system, such as where a transaction is agreed to by phone or via e-mail. Various handshake criteria, such as payment or confirmation of a completed transaction from the transaction parties, are therefore useful in various embodiments of the invention to enable feedback where other evidence of a completed transaction may not be available to the network commerce system.

In further examples, the handshake criteria is used to weight reviews in determining a feedback rating for a particular party, such that reviews associated with handshake transactions have greater weight than reviews having no association with a transaction between the reviewer and the party being reviewed. In a further embodiment, the handshake has different weight depending on the stage of the transaction used to qualify as a handshake, such that the weight given to a particular review is tied to the transaction stage or confidence in the corresponding handshake. Similarly, the sort order for display of reviews and other such functions will use an indication of whether a review is based on a handshake-qualified transaction in various embodiments.

These examples illustrate how a handshake-based network commerce system feedback system can be used to enable or identify feedback for transactions meeting certain handshake criteria. Although certain examples shown and described here, other variations exist and are within the scope of the invention. It will be appreciated by those of ordinary skill in the art that any arrangement which is designed or arranged to achieve the same purpose may be substituted for the specific embodiments shown. This application is intended to cover any adaptations or variations of the example embodiments of the invention described herein. It is intended that this invention be limited only by the claims, and the full scope of equivalents thereof.

Figure 4:
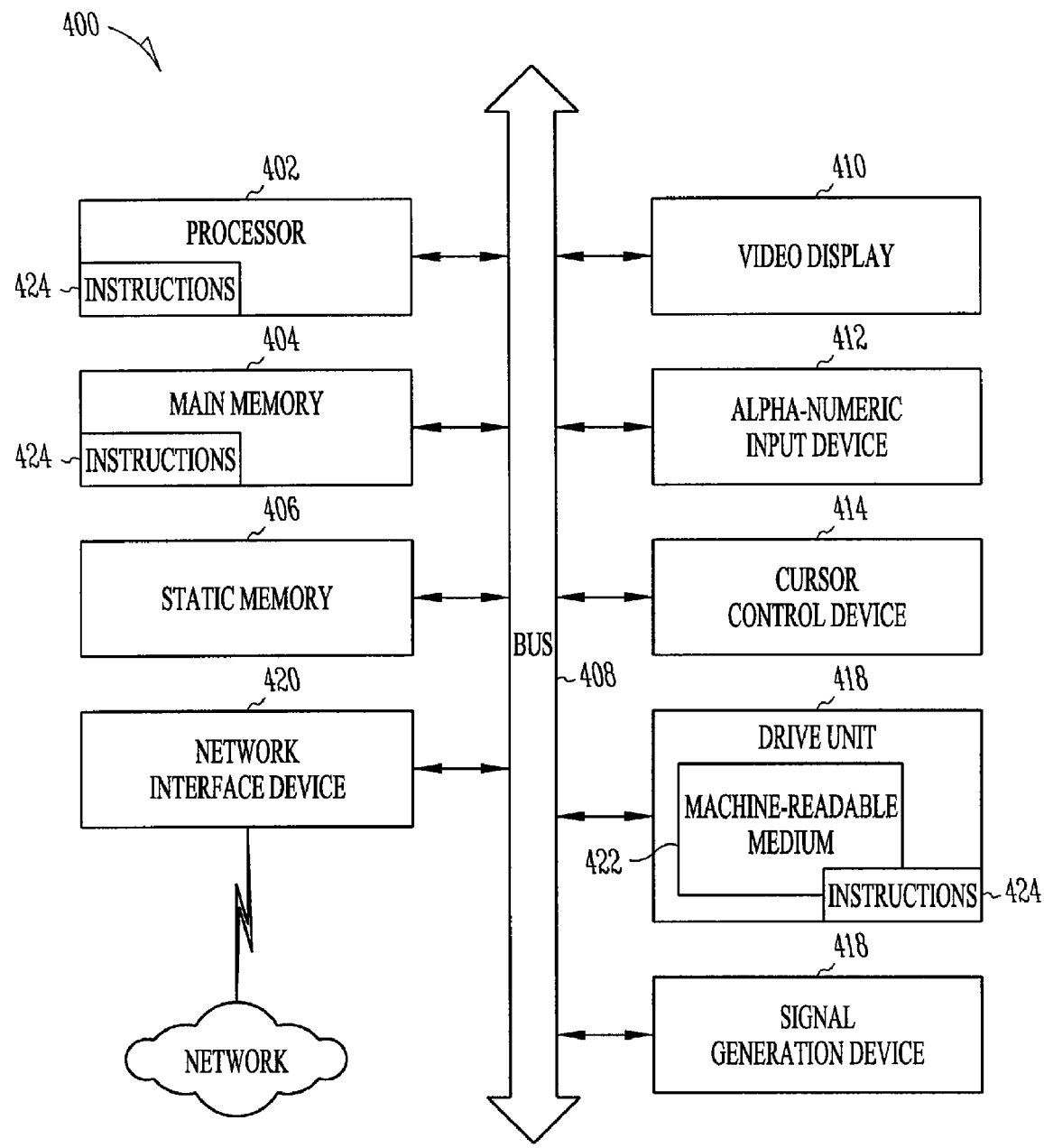
FIG. 4 is a block diagram of a computer system and a machine readable medium, as may be used to implement some embodiments of the invention.

FIG. 4 is a block diagram of machine in the example form of a computer system 400 within which a set of instructions, for causing the machine to perform any one or more of the methods discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP). Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information).

Although specific example embodiments of the invention have been described herein, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A network commerce system, comprising:
    a sale listing searchable by a consumer and comprising one or more products or services provided by a third-party vendor;
    a lead tracking module operable to track consumer leads provided to the third-party vendor for sale of the one or more products or services provided by the vendor;
    a communication module enabling the consumer and third-party vendor to communicate; and
    a feedback module enabling at least one of the consumer and the third-party vendor to leave feedback regarding a lead tracked via the lead tracking module based on a handshake evidencing a completed transaction for sale of the one or more products or services provided by the third-party vendor to the consumer resulting from the tracked lead, wherein the feedback includes information relating to an experience of the at least one consumer and the third-party vendor, the experience being associated with the transaction.

2. The network commerce system of claim 1, further comprising a payment module operable to manage payment from a consumer to a third-party vendor.

3. The network commerce system of claim 2, wherein the payment module is further operable to bill the third-party vendor a percentage of a completed transaction.

4. The network commerce system of claim 2, wherein the payment module is further operable to bill the third-party vendor on a pay-per-lead basis.

5. The network commerce system of claim 4, wherein the pay-per-lead basis is based on establishing a minimum level of communication between the consumer and the third-party vendor.

6. The network commerce system of claim 5, wherein the communication between the consumer and third-party vendor comprises at least one of e-mail message, a text message, a voice call, or a video call.

7. The network commerce system of claim 1, wherein the product sale listing is in pay-per-lead format.

8. The network commerce system of claim 1, wherein the handshake comprises payment.

9. The network commerce system of claim 1, wherein the handshake comprises confirmation of a completed transaction.

10. The network commerce system of claim 9, wherein confirmation of a completed transaction comprises confirmation from both the consumer and the third-party vendor, 11. A method of operating a network commerce system, comprising:
presenting a sale listing searchable by a consumer and comprising one or more products or services provided by a third-party vendor;
tracking consumer leads provided to the third-party vendor for sale of the one or more products or services provided by the vendor;
providing a communication system for the consumer and third-party vendor to communicate; and
receiving feedback from at least one of the consumer and the third-party vendor regarding a tracked consumer lead based on a handshake evidencing a completed transaction for sale of the one or more products or services provided by the third-party vendor to the consumer resulting from the tracked lead, wherein the feedback includes information relating to an experience of the at least one consumer and the third-party vendor, the experience being associated with the transaction.

12. The method of operating a network commerce system of claim 11, wherein the communications system is external to the network commerce system.

13. The method of operating a network commerce system of claim 11, further comprising managing payment from a consumer to a third-party vendor.

14. The method of operating a network commerce system of claim 13, wherein managing payment comprises billing the third-party vendor a percentage of a completed transaction.

15. The method of operating a network commerce system of claim 13, wherein managing payment comprises billing the third-party vendor on a pay-per-lead basis.

16. The network commerce system of claim 15, wherein the pay-per-lead basis is based on establishing a minimum level of communication between the consumer and the third-party vendor, wherein the communication between the consumer and third-party vendor comprises at least one of e-mail message, a text message, a voice call, or a video call.

17. The method of operating a network commerce system of claim 11, wherein the handshake comprises at least one of payment and confirmation of a completed transaction.

18. The method of operating a network commerce system of claim 17, wherein confirmation of a completed transaction comprises confirmation from both the consumer and the third-party vendor.

19. A machine-readable medium with instructions stored thereon, the instructions when executed operable to cause a computerized system to:
present a sale listing searchable by a consumer and comprising one or more products or services provided by a third-party vendor;
track consumer leads provided to the third-party vendor for sale of the one or more products or services provided by the vendor;
provide a communication system for the consumer and third-party vendor to communicate; and
receive feedback from at least one of the consumer and the third-party vendor regarding a tracked consumer lead based on a handshake evidencing a completed transaction for sale of the one or more products or services provided by the third-party vendor to the consumer resulting from the tracked lead, wherein the feedback includes information relating to an experience of the at least one consumer and the third-party vendor, the experience being associated with the transaction.

20. The machine-readable medium of claim 19, wherein the communications system is external to the network commerce system.

21. The machine-readable medium of claim 19, the instructions when executed further operable to manage payment from a consumer to a third-party vendor.

22. The machine-readable medium of claim 21, wherein managing payment comprises at least one of billing the third-party vendor a percentage of a completed transaction and billing the third-party vendor on a pay-per-lead basis.

23. The machine-readable medium of claim 22, wherein the pay-per-lead basis is based on establishing a minimum level of communication between the consumer and the third-party vendor, wherein the communication between the consumer and third-party vendor comprises at least one of e-mail message, a text message, a voice call, or a video call.

24. The machine-readable medium of claim 19, wherein the handshake comprises at least one of payment and confirmation of a completed transaction.

25. The machine-readable medium of claim 24, wherein confirmation of a completed transaction comprises confirmation from both the consumer and the third-party vendor.

26. A data structure, comprising:
a first set of data comprising identities of parties to a network commerce system, the parties including third party vendors providing sale listings;
a second set of data associated with the first set of data and comprising consumer leads provided to the third party vendors for sale of the one or more products or services provided by the vendor; and
a third set of data associated with the first set of data and comprising handshake data indicating a level of completed interaction between the consumer and third party vendor for sale of the one or more products or services provided by the third-party vendor to the consumer resulting from the consumer lead sufficient to enable feedback, wherein the feedback includes information relating to an experience of the at least one consumer and the third-party vendor, the experience being associated with the transaction;
the first, second, and third data sets stored on a machine-readable medium.

27. The data structure of claim 26, wherein the handshake comprises at least one of payment and confirmation of a completed transaction.

28. The data structure of claim 27, wherein confirmation of a completed transaction comprises confirmation from both the consumer and the third-party vendor.

* * * * *